Figure 1:
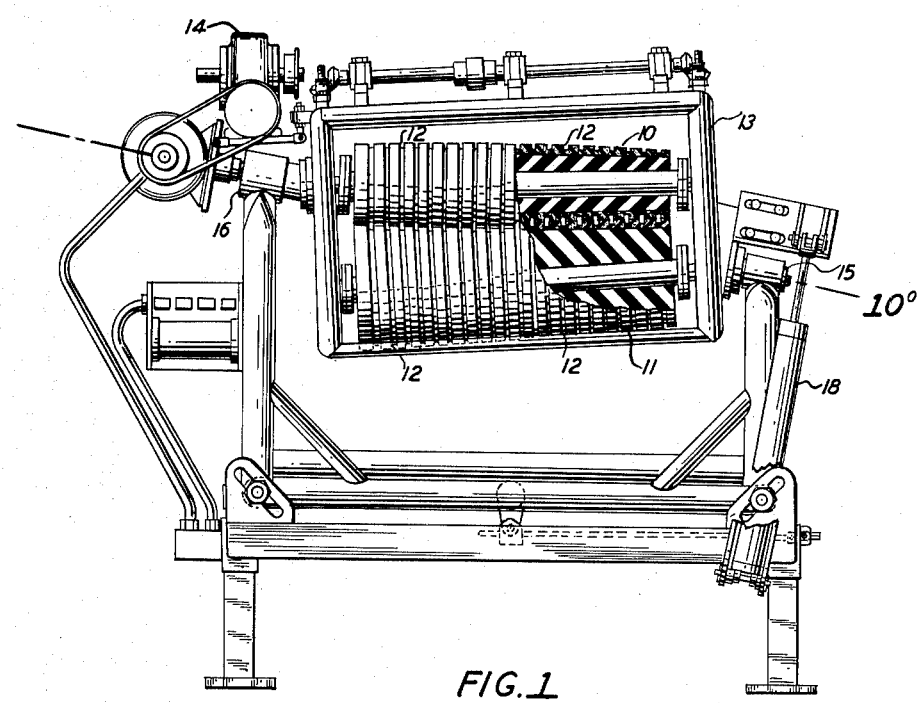

Jan. 3, 1956 G. PASCOE ET AL 2,729,581
GLASS ROLLING APPARATUS
Filed Nov. 19, 1954

G. MATVECHUK
G. PASCOE
INVENTOR.

Jan. 3, 1956  G. PASCOE ET AL  2,729,581
GLASS ROLLING APPARATUS
Filed Nov. 19, 1954  2 Sheets-Sheet 2

G. MATVECHUK
G. PASCOE
INVENTOR.

BY E. C. McRae
J. R. Faulkner
J. H. Oster

ATTORNEYS

United States Patent Office 2,729,581
Patented Jan. 3, 1956

2,729,581

GLASS ROLLING APPARATUS

George Pascoe and George Matvechuk, Detroit, Mich., assignors to Ford Motor Company, Dearborn, Mich., a corporation of Delaware Application November 19, 1954, Serial No. 469,927

4 Claims. (Cl. 154—2.7)

This invention relates, in general, to the glazing art and is specifically concerned with a process for simultaneously rolling pairs of sheets of plate glass preparatory to the production of curved laminated automotive glass.

The use of laminated glazing materials in vehicles for safety purposes is per se very old, and the art of producing such material is well-understood. Recently a demand has arisen for curved glass windshields and the production of such windshields in lamellar form has generated many technical difficulties. More recently these technical difficulties have been further confounded by the introduction of the so-called "wrap-around" windshield, in which the central portion of the windshield is a very gentle curve and the end portions are curved to a much greater degree. However, all elements of the more curved sections remain a straight line or otherwise stated the curve while changing in radius, remains a simple and not a compound curve. Production problems are further complicated by the fact that all elements of the curve are not parallel and near the ends depart decidedly from parallelism.

Apparatus described in application Serial No. 240,638, filed August 7, 1951, now U. S. Patent No. 2,673,168, has proven satisfactory for the prepressing and tacking by rolling of windshields having very slight and almost uniform curvature. However, this apparatus is not adaptable to the production of the "wrap-around" windshield and a modification described in this document has been found necessary.

Any attempt to roll a "wrap-around" windshield through ordinary cylindrical rollers is frustrated by the fact that that portion of the rolls treating the lower portion of the windshield must travel a longer distance than that portion of the rolls treating the upper portion of the windshield due to the peculiar geometry of this structure. The structure has been further modified because of the necessity of avoiding the application of an angular torque to the leading and trailing end of the windshield as it enters and leaves the rolls.

This invention is probably best understood by reference to the figures of the drawing in which—

Figure 2:
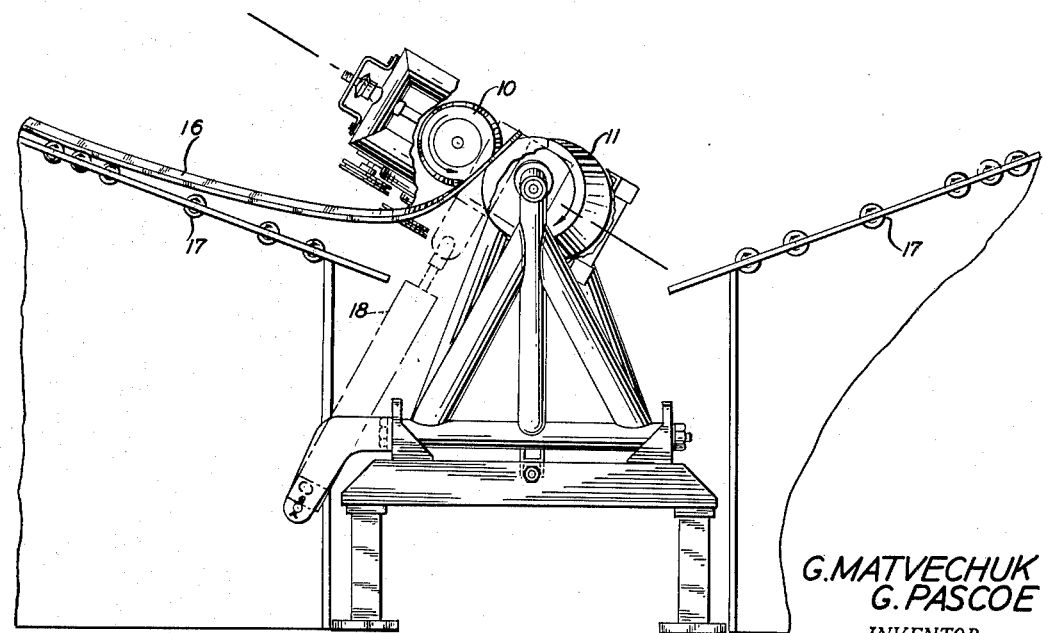
Figure 3:
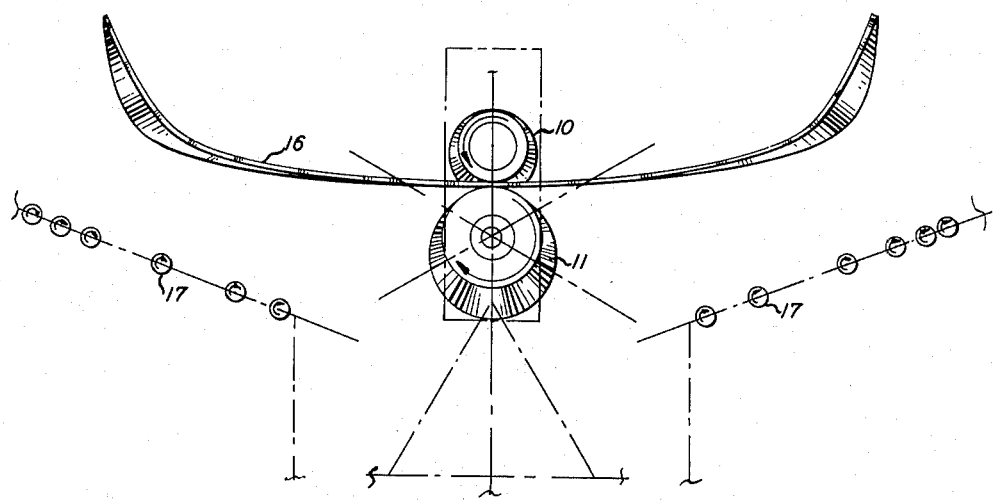
Figure 4:
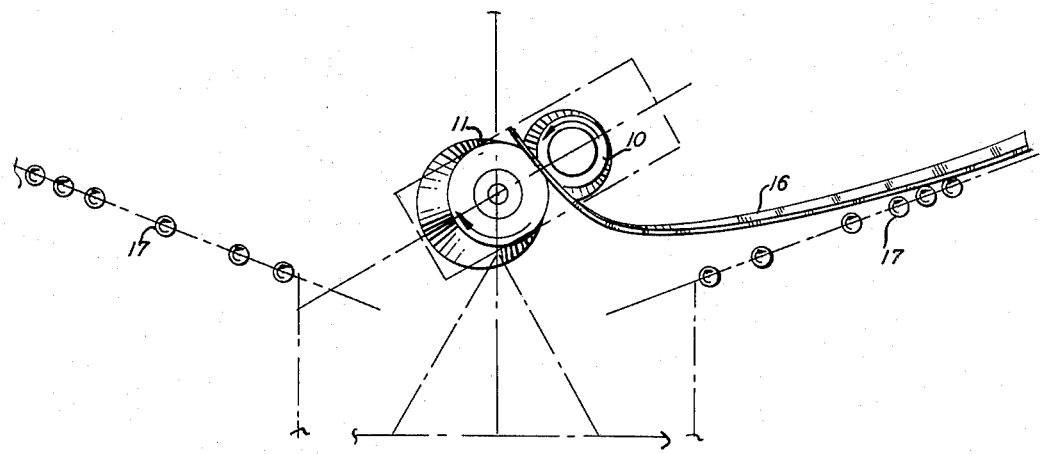

Figure 1 is an elevation of the glass rolling apparatus partially in section, and, Figure 2 is an end view of the glass rolling apparatus, and, Figure 3 is a somewhat schematic end view of the apparatus with the glass in midposition, and, Figure 4 is a smaller schematic drawing of the apparatus just prior to the discharge of the glass.

Referring to Figure 1, the actual rolling is done between upper roll 10 and roll 11, each of which are preferably provided with peripheral grooves 12. These rolls 10 and 11 are cradled in quadrilateral frame 13 and are free to rotate therein. It will be observed that lower roller 11 is greater in diameter than upper roll 10 and that neither roll is cylindrical, but that each roll tapers, becoming smaller from left to right, as seen in Figure 1.

Upper roll 10 is driven by motor 14 through a mechanism which forms no part of the invention and will not be described here in detail. Lower roll 11 is driven only by frictional contact against upper roll 10 and the glass lying between these rolls.

It will be observed that quadrilateral frame 13 is free to tilt in journal 15 and 16. The axis, upon which quadrilateral frame 13 tilts makes an angle of about 10 degrees with the horizontal.

The sequence of action in the rolling of a windshield can readily be seen from a consideration of Figures 2, 3 and 4. In each case, the windshield has been given the designation 16. When it is desired to initiate the rolling of a windshield, the quadrilateral frame 13, together with the rollers it supports is, rotated by hand or mechanically to the extreme counterclockwise position as shown in Figure 2. When in this position the rolls are inclined so that the leading edge of the glass is received without any substantial torque being applied to the glass. Rollers 17 are provided for supporting the glass after it enters and leaves the apparatus. As the rollers rotate, the glass is drawn through and approaches the position shown in Figure 3. This represents substantially the midpoint of the rolling operation. This point is marked by the fact that quadrilateral frame 13 end supported rollers 10 and 11, have rotated together clockwise and upper roll 10 is directly above lower roll 11.

As the rolling operation proceeds, the clockwise rotation of quadrilateral frame 13 continues until the position reached in Figure 4 is shown. At this point, the apparatus is prepared to completely discharge the rolled glass onto supporting rolls 17, having tilted sufficiently in a clockwise manner to avoid the application of undesirable torque to the trailing end of the windshield. Having discharged a completely rolled windshield quadrilateral frame 13, together with rolls 10 and 11, is now rotated by hand or mechanically to the extreme counterclockwise position, as shown again in Figure 3 and is realy to receive the next workpiece.

Dashpot 18, shown in Figures 1 and 2, serves the purpose of preventing unduly rapid rotation of quadrilateral frame 13 with consequent breakage of glass.

It will be understood that the invention is not to be limited to the exact construction shown and described, but that various changes and modification may be made without departing from the spirit and scope of the invention, as defined in the appended claims.

What we claim is:

1. A glass rolling device comprising a frame, a pair of elastomer rolls rotatably supported in said frame and means for rotatably driving one of said rolls, the first of said rolls being smaller in diameter than the second of said rolls and each of said rolls decreasing in diameter from one end to the other with the larger ends of the two rolls superimposed, said frame being rotatable upon an axis which makes an acute angle with the line of contact between the rolls.

2. A glass rolling device comprising a frame, a pair of elastomer rolls rotatably supported in said frame and means for rotatably driving one of said rolls, the first of said rolls being smaller in diameter than the second of said rolls and each of said rolls decreasing in diameter from one end to the other with the larger ends of the two rolls superimposed, said frame being rotatable upon an axis which makes an acute angle with the line of contact between the rolls and being restrained from rapid rotation by means of a dashpot.

3. A glass rolling device comprising a frame, a pair of elastomer rolls rotatably supported in said frame and means for rotatably driving one of said rolls, the first of said rolls being smaller in diameter than the second of said rolls and each of said rolls decreasing in diameter from one end to the other with the larger ends of the two rolls superimposed, said frame being rotatable upon an axis which makes an angle of about ten degrees with the horizontal.

4. A glass rolling device comprising a frame, a pair of elastomer rolls rotatably supported in said frame, means for rotatable driving one of said rolls and apparatus for feeding glass into said rolls with the glass in a horizontal plane, the first of said rolls being smaller in diameter than the second of said rolls and each of said rolls decreasing in diameter from one end to the other with the larger ends of the two rolls superimposed, said frame being rotatable upon an axis which makes an acute angle with the horizontal.

No references cited.